United States Patent
Gilkison et al.

(10) Patent No.: US 6,892,584 B2
(45) Date of Patent: May 17, 2005

(54) FABRICATED PITOT PROBE ASSEMBLY

(75) Inventors: Brian A. Gilkison, Shakopee, MN (US); Marc C. Moore, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 9 days.

(21) Appl. No.: 10/299,983

(22) Filed: Nov. 19, 2002

(65) Prior Publication Data

US 2004/0093953 A1 May 20, 2004

(51) Int. Cl.$^7$ .................. G01L 13/02; G01L 15/00
(52) U.S. Cl. .................. 73/736; 73/1.29; 73/861.65
(58) Field of Search ....... 73/736, 1.29, 861.65–861.68, 73/182, 861.42

(56) References Cited

U.S. PATENT DOCUMENTS

| | | | |
|---|---|---|---|
| 3,535,930 A | | 10/1970 | Rees .................. 73/212 |
| 4,378,697 A | | 4/1983 | DeLeo et al. .................. 73/182 |
| 4,458,137 A | | 7/1984 | Kirkpatrick .................. 219/201 |
| 4,730,487 A | | 3/1988 | DeLeo et al. .................. 73/182 |
| 4,836,019 A | | 6/1989 | Hagen et al. .................. 73/180 |
| 5,331,849 A | * | 7/1994 | Hedberg et al. .................. 73/182 |
| 5,628,565 A | * | 5/1997 | Hagen et al. .................. 374/143 |
| 5,731,507 A | * | 3/1998 | Hagen et al. .................. 73/182 |
| 5,970,781 A | * | 10/1999 | Hiss et al. .................. 73/28.01 |
| 6,016,688 A | * | 1/2000 | Hiss et al. .................. 73/28.01 |
| 6,370,450 B1 | * | 4/2002 | Kromer et al. .................. 701/14 |
| 6,439,027 B1 | * | 8/2002 | Hiss, III .................. 73/28.01 |
| 6,543,298 B2 | * | 4/2003 | Cronin et al. .................. 73/861.65 |
| 6,591,696 B2 | * | 7/2003 | Bachinski .................. 73/861.65 |

* cited by examiner

Primary Examiner—Edward Lefkowitz
Assistant Examiner—Jermaine Jenkins
(74) Attorney, Agent, or Firm—Westman, Champlin & Kelly, P.A.

(57) ABSTRACT

A pitot pressure sensing probe assembly is made up of individual components comprising a barrel formed with a longitudinal interior passageway and a conical end cap at its leading end. A strut that has stamped or formed sections secured together to form the strut with a compound curvature includes a neck that has a bore to receive a hub of the barrel. The end cap has a pitot port for sensing fluid pressure. The barrel includes a water trap at its leading end for trapping water and permitting it to drain through a hole in the conical end cap. The longitudinal internal passageyway carries the fluid pressure sensed by the pitot port to remote instruments. The individual components are easily formed and are secured together to make the pitot pressure sensing probe assembly.

24 Claims, 5 Drawing Sheets

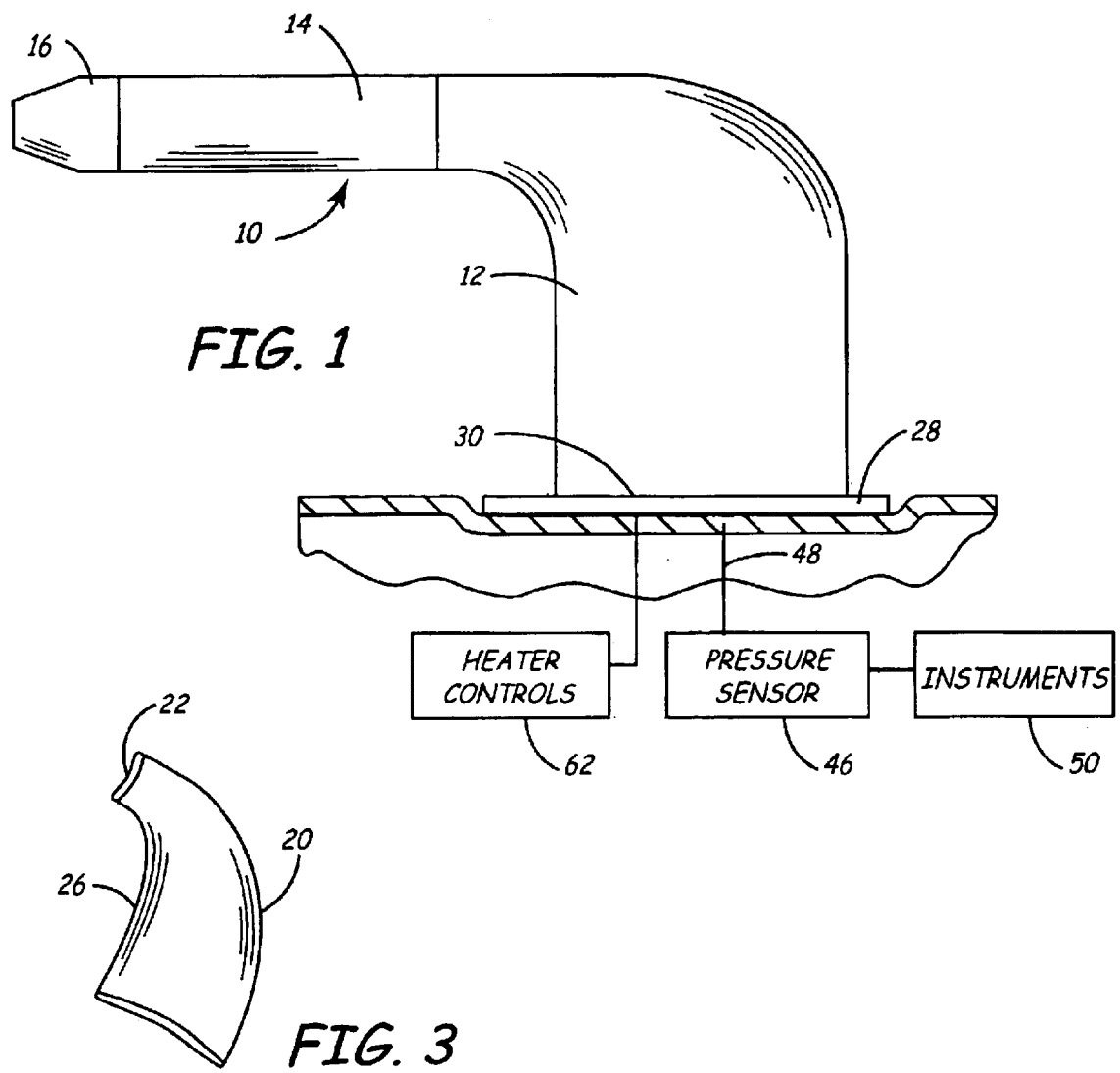

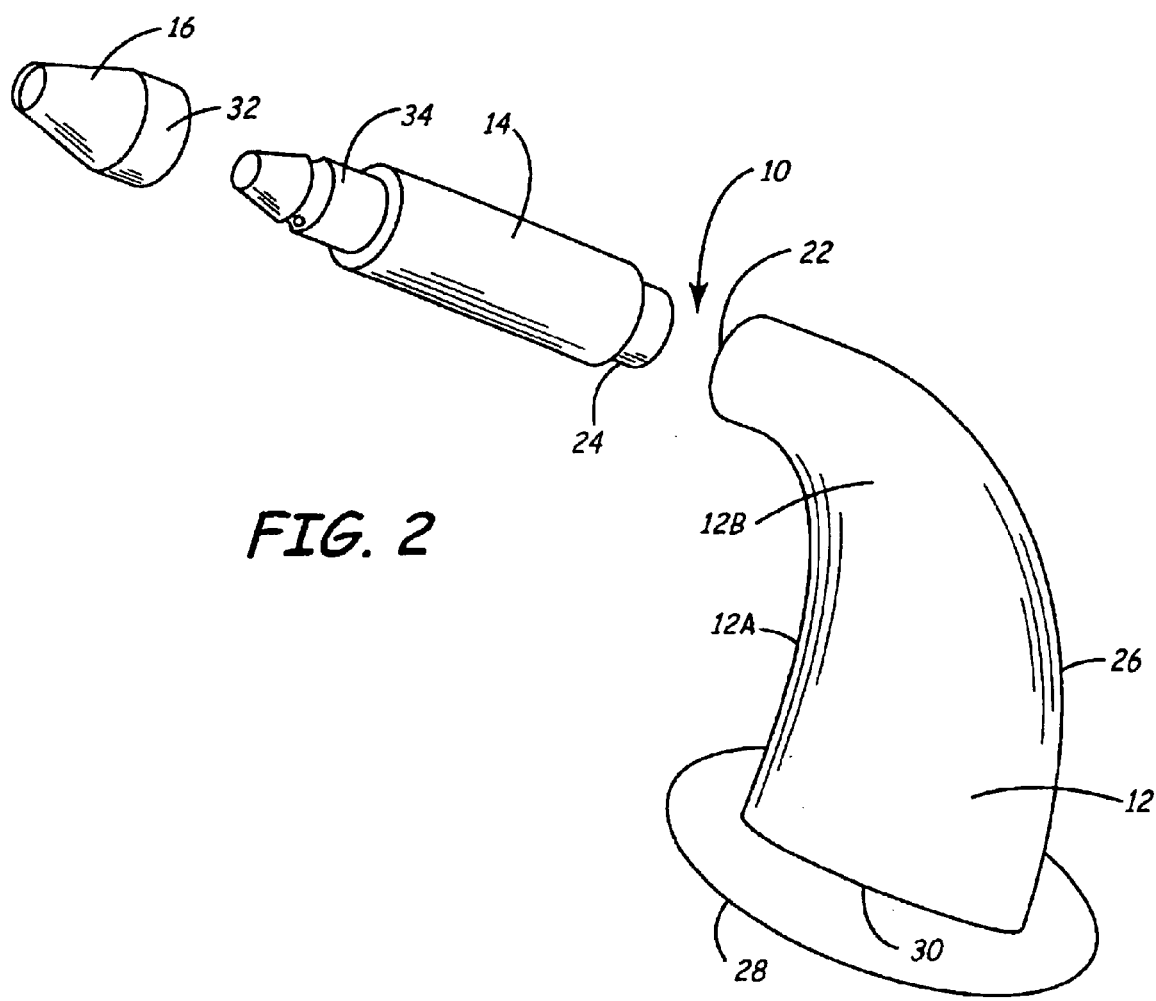

US 6,892,584 B2

FABRICATED PITOT PROBE ASSEMBLY

BACKGROUND OF THE INVENTION

The present invention relates to a pitot pressure sensing probe for use in air data sensing, which is fabricated from individual components that are preformed or machined and then assembled together. The forming of probes into various components individually, provides for a minimized amount of complex casting and machining, and uses easily made parts to provide an accurate and reliable pitot probe at a low cost.

Pitot probes traditionally have been made using a variety of parts including but not limited to cast struts, machined cylindrical probe heads, wire heaters, and pneumatic tubing. The parts are assembled using several processes, including brazing, manual force, and specialized labor. This combination of parts and processes raises the cost, particularly where the pitot probe strut mounted. The cost involved in forming wire heaters and pneumatic tubing to properly fit in a probe housing is relatively high, as it is labor intensive. Strut mounted probes are used widely in the aircraft industry.

SUMMARY OF THE INVENTION

The present invention relates to a fabricated pitot pressure sensing probe assembly, made of a number of individual components that are then secured together to form the assembly. The probe barrel can be mounted on a strut, or boom mounted, although the preferred embodiment includes a mounting strut. The pitot probe barrel and a leading end cap of the probe are made separately, and when assembled can be strut mounted or form a direct mount at the trailing end of the barrel for a boom mounted probe that will sense impact pressure.

The components that are used are relatively easily made, using standard machining practices, include a stamped strut made up in two sections, a barrel that can be machined and which is secured to the strut and extends in a forward direction, and a tubular pitot probe tip or cap which fits over the barrel and provides the proper size port and a duct that carries the pitot pressure back to sensing instruments. The end tip or cap encircles a water trap on the barrel and provides a drain opening for water.

The parts are easily fabricated and assembled, and thus the cost of the pitot probe assembly is relatively low. The ducting is accurately formed and adequately serves the purpose of carrying the pitot pressure to a pressure sensor.

BRIEF DESCRIPTION OF THE DRAWINGS

FIG. 1 is an assembled side elevational view of a strut mounted pitot pressure sensing probe made according to the present invention;

FIG. 2 is an exploded perspective view of the pitot pressure sensing probe of FIG. 1;

FIG. 3 is a perspective view of a half-side of a stamped strut used with the pitot pressure sensing probe of FIG. 1;

DETAILED DESCRIPTION OF THE PREFERRED EMBODIMENTS

Figure 4:
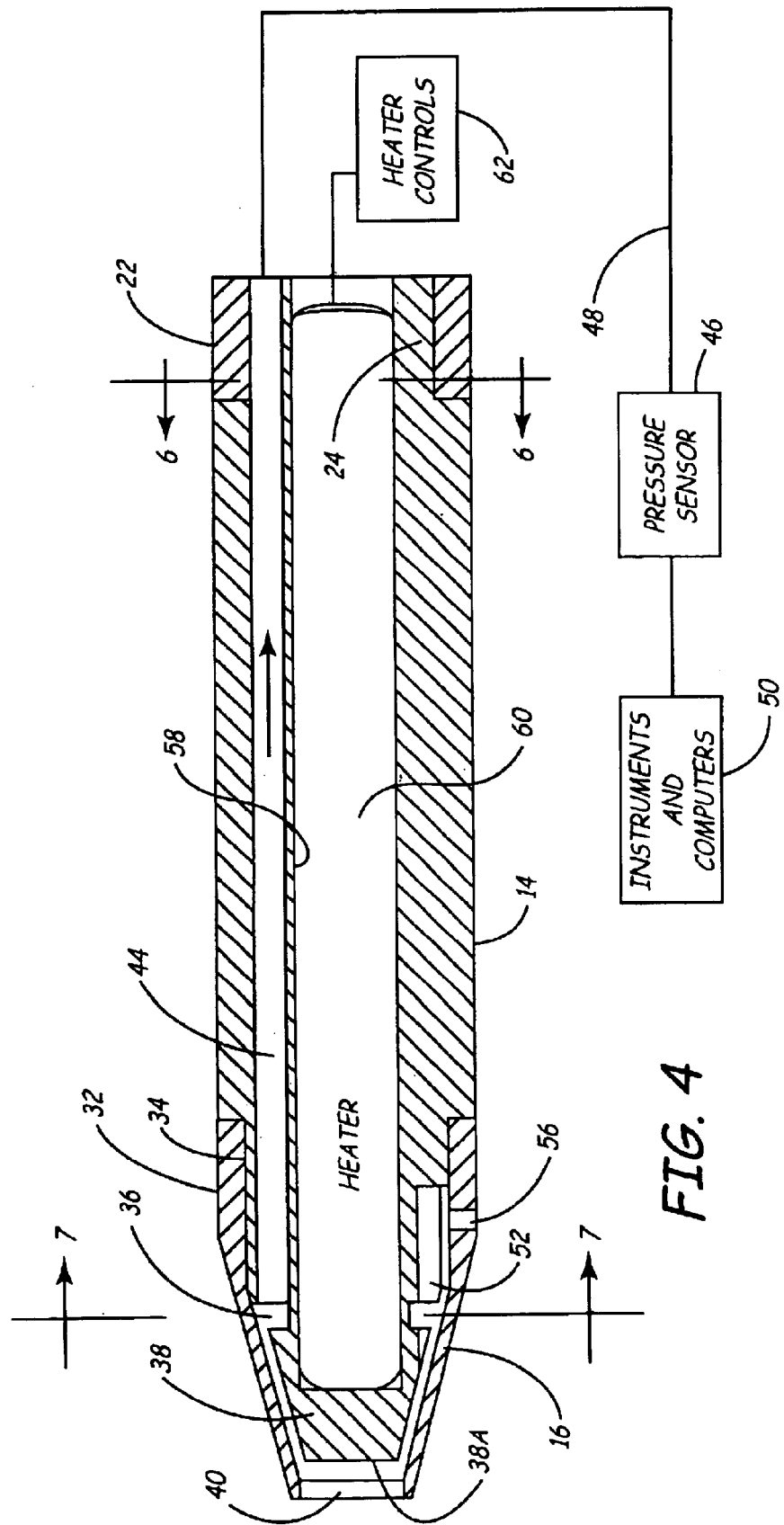
FIG. 4 is a fragmentary longitudinal cross sectional view of a barrel portion of the pitot pressure sensing probe assembly of FIG. 1.

Referring to FIGS. 1 and 2 in particular, a strut mounted pitot pressure probe tube assembly made according to the present invention is illustrated at 10, and includes a strut 12, a barrel 14, and a leading end tubular tip or cap component 16. The strut 12 is a stamped metal strut or a formed composite made up of two-half sections, which are mirror images of the other, and one section 20 of which is shown in FIG. 3. The strut section 20, as can be seen, is formed to the outer configuration that is desired, and it has an end socket or receptacle portion 22 that is made to fit over a neck or shank 24 of the barrel 14. When the two sections 20, which are mirror images of each other, are placed together, they are joined by welding along the mating edges shown at 26. The two sections of the strut form a generally airfoil shaped cross section. A base plate shown at 28 is then welded to the base end 30 of the strut assembly. The edge 26 lie on a bisecting plane of the strut. The bisecting plane is parallel to the longitudinal central axis of the barrel 14.

It can be seen that the formed or stamped strut sections can be formed to have a compound curve, with the strut 12 having a outwardly extending portion 12A, and then a curved portion 12B leading to the socket or barrel support end 22 that fits over the neck 24 of the barrel.

It is found that stamping the strut forming parts such as those shown, the parts can be held to quite close tolerances, and during the welding assembly also can be held in a form or jig that will hold them in proper shape and position.

Figure 5:
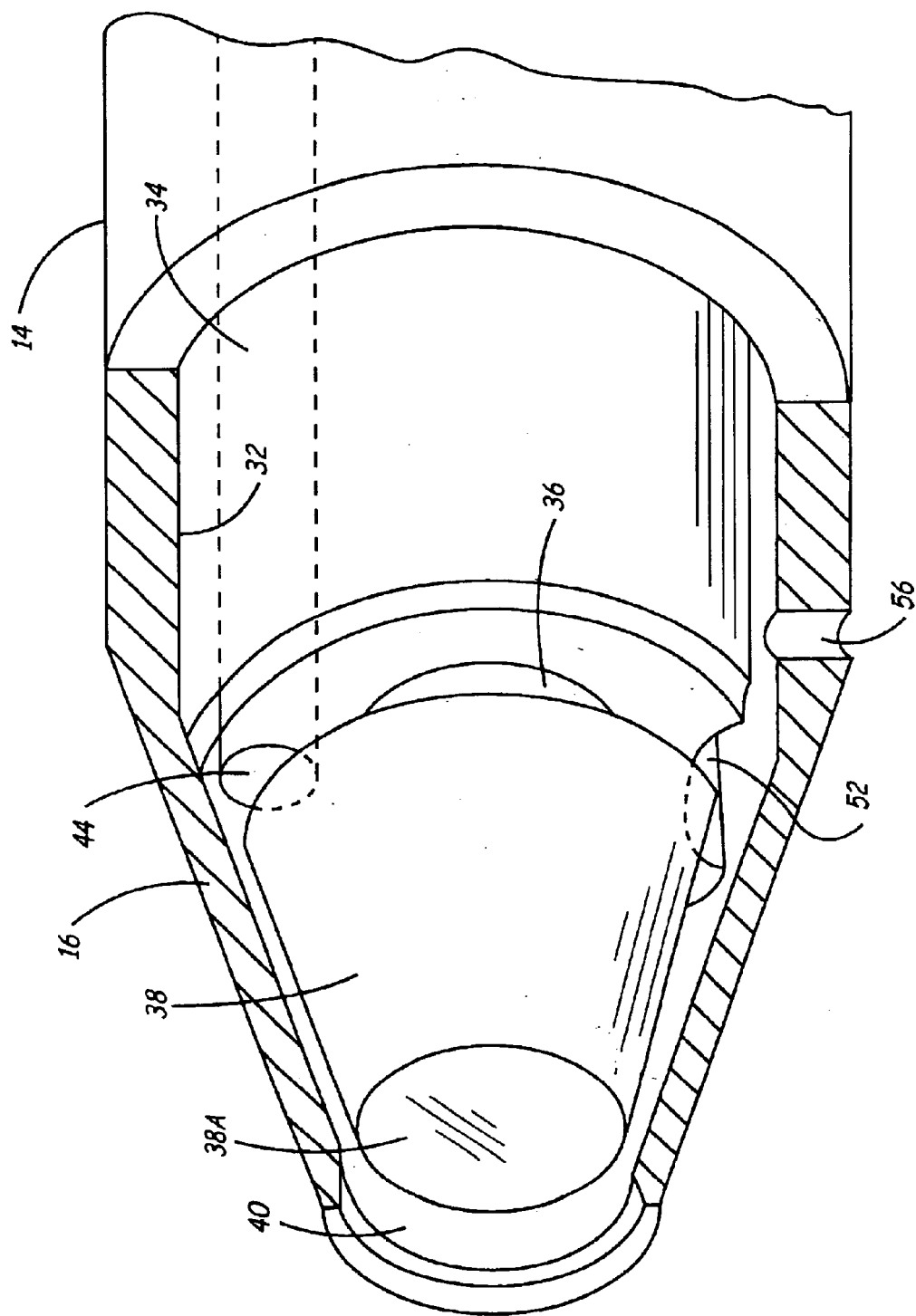
FIG. 5 is an enlarged perspective view of the outer tip of the probe with a cap broken away.
Figure 6:
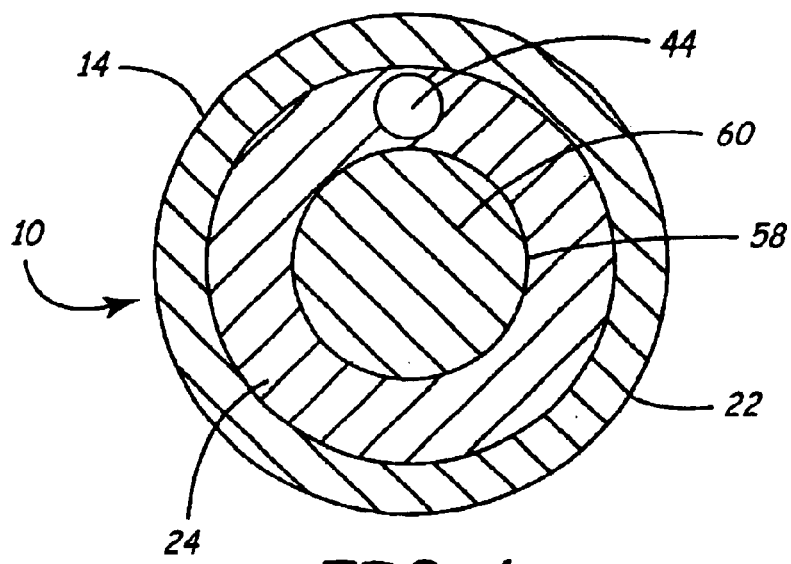
FIG. 6 is a sectional view taken as on line 6—6 in FIG. 4.
Figure 7:
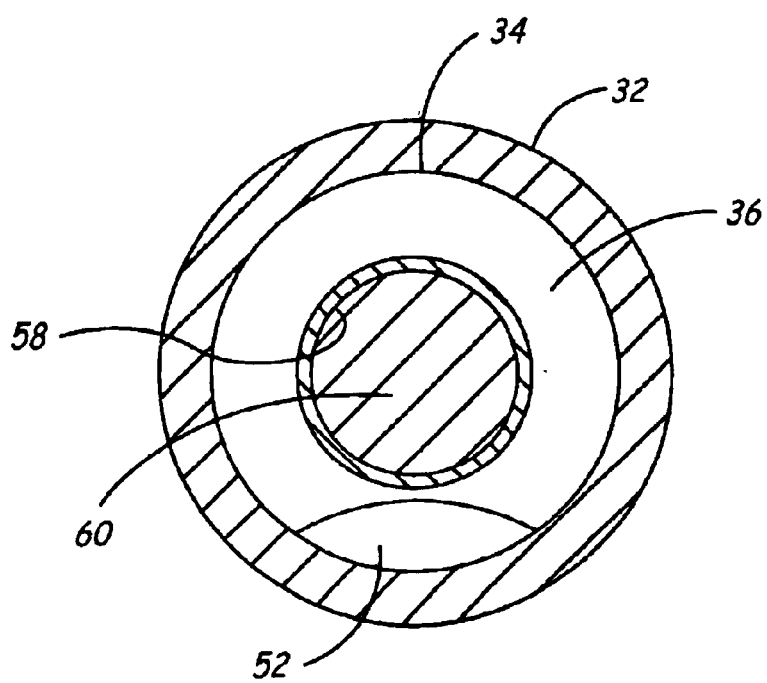
FIG. 7 is a sectional view taken on line 7—7 in FIG. 4.

As shown in FIG. 4, the nose cone or cap 16 which is shown in cross section in FIGS. 4 and 5, has a cylindrical end portion 32 that fits over a reduced hub section 34 of the barrel 14, and the interior of the end portion cone or cap 16 surrounds the hub 34. The probe barrel has an annular, reduced diameter recess or groove 36, which extends around the barrel at the outer or leading end of the hub 34. The barrel 14 also has a conical end plug 38 that is truncated to form a blunt end surface 38A. The outer cone or cap 16 tapers toward a forward end pitot port 40, and has a generally conical inner surface that is spaced from the conical surface of the plug 38, so that fluid pressure acts through the passageway between the inner surface of the conical tip 16 and the outer surface of plug 38, and is present the annular recess 36.

As can be seen in FIGS. 4 and 5, the annular recess 36 opens to a longitudinal extending bore 44 that carries the fluid pressure toward the rear end or strut end of the barrel 14. A suitable fitting can be fitted into this bore 44, and connected with a suitable line 48 to a pressure sensor 46. The output signal from pressure sensor 46 provides a signal to aircraft instruments or flight management computers 50.

The hub 34 has a recess 52 extending in its longitudinal direction at a lower side of the barrel 14. The longitudinal recess 52 also is open to the annular recess 36.

The cone tip 16 has a drain hole or port 56 on a lower side thereof that drains water that collects in the annular recess 36 and recess 50 on the barrel 14 out through the opening 56. Groove 36 forms a water trap in connection with the recess 52.

The barrel 14 also has a central bore 58, centered on the barrel central longitudinal axis, that is of size to receive a heater cartridge 60, which is used for deicing heaters on the pitot pressure sensor probe. The heater 60 is connected to suitable heater controls 62 by passing the lines through the strut 12 and base plate 28, and into the interior of an aircraft on which the strut is mounted.

It can be seen that the pitot port 40 will provide fluid under pressure to the bore 44, and to the pressure sensing instruments with the strut supporting the barrel in its useable position.

The annular groove 36 provides a small plenum for carrying the fluid pressure, as well as a trap for water, so that water will drain from the bore 56 and will not contaminate the pressure sensing system.

Four components, namely the two half sections forming the strut, the barrel, and the cone are all easily formed for the strut mounted probe. For a boom probe only two components, the barrel and the leading end cap are needed. The base of the barrel is then mounted directly to the aircraft. The barrel has bores and turned surfaces that are quickly formed on screw machines, and the cone tip or cap member can be swaged or machined quite easily as well. The welding that is used for holding the cone end 16 in place is easily done. The barrel is also easily mounted on a support. Welding the strut onto the barrel 14, also is quickly and reliably done. The parts can be made of suitable materials, such as titanium alloys, or other high strength alloys, or even composite materials that formed and held together with adhesives.

The cartridge heater can be of any desired type and is selected to provide adequate heat for deicing under normal aircraft operating conditions. The heater size is selected using known parameters.

Although the present invention has been described with reference to preferred embodiments, workers skilled in the art will recognize that changes may be made in form and detail without departing from the spirit and scope of the invention.

What is claimed is:

1. A pitot pressure sensing probe assembly comprising a pitot pressure sensing barrel having a pitot pressure sensing port at a leading end thereof, a trailing end of the barrel adapted for mounting on a support, the barrel having an internal longitudinal passage, the leading end of the barrel having an opening to the passageway, and a cap member formed as a separate part surrounding the leading end of the barrel and tapering to a smaller size in a direction away from the trailing end of the barrel to form a pitot pressure sensing port centered on a longitudinal axis of the barrel, the cap member defining a lead in passageway from the port to the longitudinal passageway.

2. The pitot probe of claim 1, wherein the cap member is in the shape of a cone and has a cylindrical bore at an end portion opposite from the pitot pressure sensing port, the leading end of the barrel having a cylindrical hub that is inserted into the cylindrical bore of the cone shaped cap member.

3. The pitot probe of claim 2 wherein said leading end of the barrel has at least a part annular recess spaced toward the pitot pressure sensing port from the hub, said internal longitudinally extending passageway opening to the at least part annular recess, and said cap member having an internal conical surface forming the lead in passageway from the pitot pressure port to the recess, whereby pressure at the pitot pressure sensing port is exerted at the recess and in the internal longitudinally extending passageway of the barrel.

4. The pitot probe of claim 3 wherein said leading end of the barrel has a conical outer surface spaced from and extending along the internal conical surface of the cap member to form the lead in passageway.

5. A multi-component strut mounted pitot tube assembly comprising a strut, a barrel supported on the strut and having a pressure sensing opening at a first leading end, the strut having an end bore forming a receptacle for receiving a second trailing end portion of the barrel, and the barrel having a reduced diameter neck portion at the second trailing end fitted into the receptacle and being secured to the strut.

6. The pitot tube assembly of claim 5, wherein the barrel has a central longitudinal axis, and wherein said strut is made up of two metal sections formed to have a generally airfoil shaped exterior cross section configuration and a hollow interior, and the sections being fixedly joined at mating edges along a bisecting plane between the strut sections, the bisecting plane lying along the barrel central longitudinal axis.

7. The pitot tube assembly of claim 6, wherein said barrel reduced diameter neck portion comprises a reduced end shank, said strut having an end portion forming the receptacle and fitting over said shank, and the strut end portion being substantially flush around an outer surface of a main portion of the barrel when the strut end portion is fitted around said shank with the shank in the receptacle.

8. The pitot tube assembly of claim 5, wherein there is a separate leading end component comprising a tubular cap secured to the first leading end of the barrel, opposite from the barrel portion fitted into the receptacle, said tubular cap having a conical outer surface leading end forming a pressure port extending in an upstream direction, and a bore at its opposite end, the barrel having a hub received in the bore at a trailing end of the tubular cap, the barrel first leading end having an end portion with an end surface aligned with the pressure port, the end portion being spaced from an interior surface of the tubular cap to form a passageway open to the pressure port, the pressure sensing opening at the first leading end of the barrel comprising an annular groove spaced from the end surface and surrounded by the trailing end of the tubular cap, the passageway being open to the annular groove, and the pressure sensing opening at the first leading end of the barrel further comprising a longitudinal bore in the barrel for carrying fluid pressure from the annular groove to a remote location.

9. The pitot tube assembly of claim 8, wherein there is a recess formed between the end portion of the barrel and the tubular cap on a lower side of the pitot tube assembly for collecting liquid entering the pressure port, and a drain hole in the tubular cap opening to the recess.

10. The pitot tube assembly of claim 8, wherein said barrel has a second bore extending longitudinally and separate from the longitudinal bore for carrying fluid pressure, said second bore being of size to receive heater for heating the barrel.

11. The pitot tube assembly of claim 8, wherein the barrel end portion has a generally conical outer surface, said tubular cap having a conical inner surface spaced from and extending along the conical outer surface of the end portion of the barrel to define the passageway.

12. A pitot pressure sensing probe assembly comprising a pitot pressure sensing barrel having a pitot pressure sensing port at a leading end thereof, a trailing end of the barrel having a reduced diameter shank, a strut having a base end, and a barrel receiving end, said barrel receiving end comprising a bore of size to receive the shank for fixedly mounting the shank on the strut, the barrel having a longitudinal axis, and the strut curving away from the axis to the base end.

13. The pitot probe of claim 12, wherein said strut is formed of two mirror image strut sections and wherein each of the strut sections terminates at edges spaced along a bisecting plane of the strut, said edges being secured to edges of the other strut section to form the strut to hold the shank of the barrel.

14. The pitot probe of claim 1, wherein the barrel has an internal longitudinal passage and the leading end of the barrel has an opening to the passageway, and a cap member surrounding the leading end of the barrel tapering toward the longitudinal axis in a direction away from the trailing end of the barrel to form a pitot pressure sensing port centered on the longitudinal axis of the barrel.

15. The pitot probe of claim 1, wherein the leading end of the barrel has an at least partially annular recess defined by radially extending surfaces positioned on an interior of said cap member, the cap member being in the shape of a cone, and said cap member having an opening forming a drain hole therein that is in fluid communication with the annular recess.

16. The pitot probe of claim 14, wherein said internal longitudinally extending passageway is open to the at least partially annular recess, and said cap member forming a fluid passageway from the pitot pressure port to the recess, whereby pressure at the pitot pressure sensing port is exerted at the recess and in the internal longitudinally extending passageway of the barrel.

17. The pitot probe of claim 16, wherein said barrel has a recess formed on a lower side thereof that opens to an exterior of the barrel, and said recess being open to an interior of the cap member, whereby liquid can accumulate in the recess and ultimately drain out through the opening in the cap member.

18. The pitot probe of claim 16, wherein the leading end of the barrel comprises a leading end portion that extends in an upstream direction from the at least part annular recess, and has a conically shaped outer surface, said cap member having a conically shaped inner surface that is spaced from the conically shaped outer surface of the barrel leading end portion to form a fluid pressure passageway between the pitot pressure sensing port and the at least part annular recess.

19. The pitot probe of claim 14, wherein said internal longitudinally extending passageway comprises a pressure passage bore adjacent an outer perimeter of the barrel, and a centrally located second bore formed in the barrel and being of size to receive a heater for heating the pitot probe.

20. A pressure sensing probe assembly comprising barrel having at least one pressure sensing port, a leading end and a trailing end, the trailing end of the barrel having a reduced diameter shank, a strut having a base end, and a barrel receiving end, said barrel receiving end having a housing forming a bore of size to receive the shank for fixedly mounting the shank on the strut with the shank in the bore, the barrel having a longitudinal axis, the strut curving way from the longitudinal axis such that the base end is offset from the longitudinal axis, said strut being formed of two mirror image strut sections, each of the strut sections being concave and having peripheral edges along a bisecting plane lying along the longitudinal axis of the probe, said peripheral edge of the two strut sections mating and being secured together to form the strut to hold the shank of the barrel.

21. The pressure sensing probe of claim 20, wherein there is a separate leading end component comprising a tubular cap secured to the leading end of the barrel, said tubular cap having a conical leading end forming a pressure port extending in an upstream direction, and the tubular cap having a bore at an opposite end, the barrel having a hub for mounting inside the bore at the opposite end of the tubular cap, the barrel having a longitudinal bore fluidly open to the pressure port.

22. The method of constructing a pitot probe having a barrel and a strut, comprising forming two sections of a strut in a desired shape which are substantially mirror images of each other; forming a barrel having an end hub portion, the two sections of the strut being mated together to form a bore for receiving the hub portion of the barrel, securing the two sections of the strut and the barrel in an assembly, providing an outer end cap for an end of the barrel opposite from the strut, said end cap mounting on the barrel and being spaced from the barrel to provide a fluid passage from an end opening on the end cap to a bore in the barrel.

23. The method of claim 22, wherein said strut sections are stamped metal sections, and said barrel is a solid member having a bore formed therein.

24. The method of claim 23, wherein said end cap member is formed to be generally conically shaped with an opening at a leading end thereof, said conically shaped end member having an interior conically shaped surface, and further comprising fitting the conically shaped end cap member onto a leading end of the barrel to provide a fluid passageway from the leading end opening of the end cap member to a bore in the barrel.

* * * * *

UNITED STATES PATENT AND TRADEMARK OFFICE
CERTIFICATE OF CORRECTION

PATENT NO. : 6,892,584 B2
DATED : May 17, 2005
INVENTOR(S) : Brian A. Gilkison and Marc C. Moore It is certified that error appears in the above-identified patent and that said Letters Patent is hereby corrected as shown below:

Column 5,
Line 5, "1" should read -- 12 --.
Line 12, "1" should read -- 14 --.

Column 6,
Line 12, "edge" should read -- edges --.

Signed and Sealed this

Fifteenth Day of November, 2005

JON W. DUDAS
*Director of the United States Patent and Trademark Office*